(12) United States Patent
Shu et al.

(10) Patent No.: US 9,008,041 B2
(45) Date of Patent: Apr. 14, 2015

(54) PROCESSING METHOD SUPPORTING HANDOVER, COMMUNICATION APPARATUS, AND COMMUNICATION SYSTEM

(75) Inventors: Guiming Shu, Shenzhen (CN); Zhiming Ding, Shenzhen (CN); Yongli Yang, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 624 days.

(21) Appl. No.: 13/354,916

(22) Filed: Jan. 20, 2012

(65) Prior Publication Data
US 2012/0120919 A1 May 17, 2012

Related U.S. Application Data

(63) Continuation of application No. PCT/CN2010/073782, filed on Jun. 11, 2010.

(30) Foreign Application Priority Data

Jul. 21, 2009 (CN) .......................... 2009 1 0157625

(51) Int. Cl.
| | |
|---|---|
| H04L 12/10 | (2006.01) |
| H04W 36/00 | (2009.01) |
| H04L 29/06 | (2006.01) |
| H04W 12/10 | (2009.01) |
| H04W 48/20 | (2009.01) |

(52) U.S. Cl.
CPC ......... *H04W 36/0038* (2013.01); *H04L 63/126* (2013.01); *H04W 12/10* (2013.01); *H04W 48/20* (2013.01)

(58) Field of Classification Search
None
See application file for complete search history.

(56) References Cited

U.S. PATENT DOCUMENTS

2005/0136892 A1 6/2005 Oesterling et al.
2005/0153692 A1 7/2005 Hwang et al.
(Continued)

FOREIGN PATENT DOCUMENTS

| CN | 1909739 A | 2/2007 |
|---|---|---|
| EP | 1638360 A1 | 9/2005 |
| WO | WO 2011/009347 A1 | 1/2011 |

OTHER PUBLICATIONS

International Search Report for International Application No. PCT/CN2010/073782, mailed Sep. 16, 2010 Huawei Technologies Co., Ltd.

(Continued)

*Primary Examiner* — Hassan Phillips
*Assistant Examiner* — Omeed D Rahgozar
(74) *Attorney, Agent, or Firm* — Conley Rose, P.C.; Grant Rodolph; Nicholas K. Beaulieu

(57) ABSTRACT

The present invention discloses a processing method supporting handover, and communication apparatus, which can reduce an impact on an existing network. The method includes: A handover service function entity receives an identifier of a first AP from an MS, where the first AP is discovered in a WiFi network, and determines, according to the identifier of the first AP, an authenticator entity corresponding to the first AP corresponding to the identifier; establishes a connection with the MS; receives from the MS a probe request message for probing an AP to be associated; and returns to the MS a probe request response message that carries an identifier of an AP to be associated with the MS, so that the MS associates with the AP corresponding to the identifier of the AP to be associated, and accesses the WiFi network through the AP to be associated and the authenticator entity.

16 Claims, 8 Drawing Sheets

(56) References Cited

U.S. PATENT DOCUMENTS

2005/0286466 A1* 12/2005 Tagg et al. .................. 370/329
2007/0140163 A1   6/2007 Meier et al.
2007/0160017 A1   7/2007 Meier et al.

OTHER PUBLICATIONS

Written Opinion of the International Searching Authority (translation) dated (mailed) Sep. 4, 2008, issued in related Application No. PCT/CN2010/073782, filed Jun. 11, 2010, Huawei Technologies Co., Ltd.

* cited by examiner

PROCESSING METHOD SUPPORTING HANDOVER, COMMUNICATION APPARATUS, AND COMMUNICATION SYSTEM

CROSS-REFERENCE TO RELATED APPLICATIONS

This application is a continuation of International Application No. PCT/CN2010/073782, filed on Jun. 11, 2010, which claims priority to Chinese Patent Application No. 200910157625.8, filed on Jul. 21, 2009, both of which are hereby incorporated by reference in their entireties.

FIELD OF THE INVENTION

The present invention relates to the field of communication technologies, and in particular, to a processing method supporting handover, communication apparatus, and communication system.

BACKGROUND OF THE INVENTION

Wireless fidelity (WiFi) is a wireless local area network technology. According to different network deployment architectures, a wireless local area network (WLAN) may be categorized into two types. One is a WLAN where an access point (AP) uses a centralized authentication architecture of a thin AP. The WLAN of this type uses a unified authenticator which is located on an access controller (AC) to provide access authentication for a terminal device, and each AP in the network does not provide the function of an authenticator. The other is a WLAN where the AP uses a distributed authentication architecture of a fat AP. In the WLAN of this type, each AP device provides the function of an authenticator, and the AP provides, by using its own authenticator, a network access authentication function for the terminal device. Worldwide interoperability for microwave access (WiMAX) is a wireless broadband access technology. The WiMAX is characterized by wide coverage of an AP. WiFi is characterized by low power, simple implementation, and low cost. WiMAX and WiFi can be mutually complementary. Therefore, WiMAX-WiFi interoperation becomes a hot research topic.

In the prior art, as regards a dual radio MS, when the MS uses a WiMAX radio unit to perform a communication service through a WiMAX network, the MS may use a WiFi radio unit to access a WiFi network concurrently. During handover, service continuity may be ensured only if the MS accesses the WiFi network in advance. As regards a single radio MS (for example, a dual-receiving and single-transmitting MS), only one radio unit can be used for transmission at a time, while a WiFi radio receiving unit may discover an available AP in the WiFi network, obtain the BSSID of the AP, and send the BSSID of the AP to a WiFi SFF (WiFi Signal forward function) to enable the WiFi SFF to determine a target AP. However, when the MS uses the WiMAX radio unit to perform the communication service through the WiMAX network, the MS cannot use the WiFi radio unit to access a WiFi network concurrently. In this way, when the MS hands over from the WiMAX network to the WiFi network, the MS disables the WiMAX radio unit and then enables the WiFi radio unit, and accesses the WiFi network by using the WiFi SFF.

During the process of researching and practicing this method, the inventor of the present invention finds that:

In the prior art, types of a target WiFi network are not taken into consideration, the WiFi SFF only provides an AP simulation function. According to this solution, great improvements need to be made on an existing network during implementation, and network deployment is complex.

SUMMARY OF THE INVENTION

Embodiments of the present invention provide a processing method supporting handover, communication apparatus, and communication system, which can reduce an impact on an existing network.

A processing method supporting handover includes:

receiving, by a handover service function entity, an identifier of a first access point (AP) from a mobile station (MS), wherein the identifier of the first AP is sent by a mobile station (MS) and the first AP is discovered, by the MS, in a wireless fidelity (WiFi) network, and determining, according to the identifier of the first AP, an authenticator entity corresponding to the first AP corresponding to the identifier;

establishing, by the handover server service function entity, a connection with the MS;

receiving from the MS a probe request message that is sent by the MS and used to probe for probing an AP to be associated; and returning to the MS a probe response probe request response message carrying message that carries an identifier of the an AP to be associated with the MS, so that the MS is associated associates with the AP to be associated, wherein the AP to be associated corresponds corresponding corresponding to the identifier of the AP to be associated, and performs a network access operation to accesses accesses the WiFi network by using through the AP to be associated and the authenticator entity.

A processing method supporting handover includes:

discovering, by a mobile station (MS), a first access point (AP) in a wireless fidelity (WiFi) network, and obtaining an identifier of the first AP;

sending the obtained identifier of the first AP to a handover service function entity, so that the handover service function entity discovers, according to the identifier, an authenticator entity corresponding to the first AP corresponding to the identifier;

establishing, by the MS, a connection with the handover service function entity;

sending to the handover service function entity a probe request message for probing that is used to probe an AP to be associated; receiving from the handover service function entity a probe response probe request response message carrying message that is returned by the handover service function entity and carries an identifier of the an AP to be associated with the MS; and associating with the AP to be associated, wherein the AP to be associated corresponds corresponding corresponding to the identifier of the AP to be associated, and performing a network access operation to accessing accessing the WiFi network by using through the AP to be associated and the authenticator entity.

A communication apparatus includes:

a first receiving unit, configured to receive an identifier of a first access point (AP) from a mobile station (MS), wherein the identifier of the first AP is sent by a mobile station (MS) and the first AP is discovered, by the MS, in a wireless fidelity (WiFi) network;

a target determining unit, configured to determine, according to the identifier of the first AP, an authenticator entity corresponding to the first AP corresponding to the identifier;

a first processing unit, configured to establish a connection with the MS;

a second receiving unit, configured to receive from the MS a probe request message that is sent by the MS and used to probe for probing an AP to be associated; and a second processing unit, configured to return to the MS a probe response probe request response message carrying message that carries an identifier of the an AP to be associated with the MS, so that the MS is associated associates with the AP to be associated, wherein the AP to be associated corresponds corresponding corresponding to the identifier of the AP to be associated, and performs a network access operation to accesses accesses the WiFi network by using through the AP to be associated and the authenticator entity.

A communication apparatus includes:

an obtaining unit, configured to discover a first access point (AP) in a wireless fidelity (WiFi) network and obtain an identifier of the first AP;

a first sending unit, configured to send the obtained identifier of the first AP to a handover service function entity, so that the handover service function entity determines, according to the identifier, an authenticator entity corresponding to the first AP corresponding to the identifier;

a first processing unit, configured to establish a connection with the handover service function entity;

a second sending unit, configured to send to the handover service function entity a probe request message for probing that is used to probe an AP to be associated;

a receiving unit, configured to receive from the handover service function entity a probe response probe request response message carrying message that is returned by the handover service function entity and carries an identifier of the an AP to be associated with a mobile station (MS); and a second processing unit, configured to associate with the AP to be associated, wherein the AP to be associated corresponds corresponding to the identifier of the AP to be associated, and perform a network access operation to access accesses the WiFi network by using through the AP to be associated and the authenticator entity.

A communication system includes:

an MS, configured to: discover a first AP in a WiFi network and obtain an identifier of the first AP; send the obtained identifier of the first AP to a handover service function entity, so that the handover service function entity determines, according to the identifier, an authenticator entity corresponding to the first AP corresponding to the identifier; establish a connection with the handover service function entity; send to the handover service function entity a probe request message that is used to probe an AP to be associated; receive a probe request response message that is returned by the handover service function entity and carries an identifier of the AP to be associated with the MS; associate with the AP to be associated, where the AP to be associated corresponds to the identifier of the AP to be associated, and access the WiFi network through the AP to be associated and the authenticator entity;

the handover service function entity, configured to: receive the identifier of the first AP, where the identifier of the first AP is sent by the MS and the first AP is discovered in the WiFi network; determine, according to the identifier of the first AP, the authenticator entity corresponding to the first AP corresponding to the identifier; establish a connection with the MS; receive the probe request message that is sent by the MS and used to probe the AP to be associated; and return to the MS the probe request response message that carries the identifier of the AP to be associated with the MS.

It can be seen from the foregoing technical solutions that, according to the technical solutions disclosed in the embodiments of the present invention, a handover service function entity receives an identifier of a first AP, where the identifier of the first AP is sent by an MS and the first AP is discovered in a WiFi network, and determines, according to the identifier of the first AP, an authenticator entity corresponding to the first AP corresponding to the identifier; after establishing a connection with the MS, receives a probe request message that is sent by the MS and used to probe an AP to be associated; and returns to the MS a probe request response message that carries an identifier of the AP to be associated with the MS, so that the MS is associated with the AP to be associated, where the AP to be associated corresponds to the identifier of the AP to be associated, and accesses the WiFi network through the AP to be associated and the authenticator entity. With such processing procedures for the identifier of the AP to be associated, great changes do not need to be performed on the existing network, and network deployment is simple.

BRIEF DESCRIPTION OF THE DRAWINGS

To make the technical solutions of the embodiments of the present invention or the prior art clearer, accompanying drawings used in the description of the embodiments or the prior art are briefly described below. Evidently, the accompanying drawings in the following description are only some embodiments of the present invention, and persons of ordinary skill in the art may further obtain other drawings from these drawings without creative efforts.

DETAILED DESCRIPTION OF THE EMBODIMENTS

The technical solutions disclosed in the embodiments of the present invention are clearly and completely described below with reference to the accompanying drawings in the embodiments of the present invention. Evidently, the embodiments to be described are only part of rather than all of the embodiments of the present invention. All other embodiments obtained by persons of ordinary skill in the art based on the embodiments of the present invention without creative efforts shall fall within the scope of the present invention.

An embodiment of the present invention provides a processing method supporting handover, which can enable an MS to perform a network access operation that supports handover before the handover. Embodiments of the present invention also provide a corresponding communication apparatus and communication system. The following gives a detailed description respectively.

Figure 1:
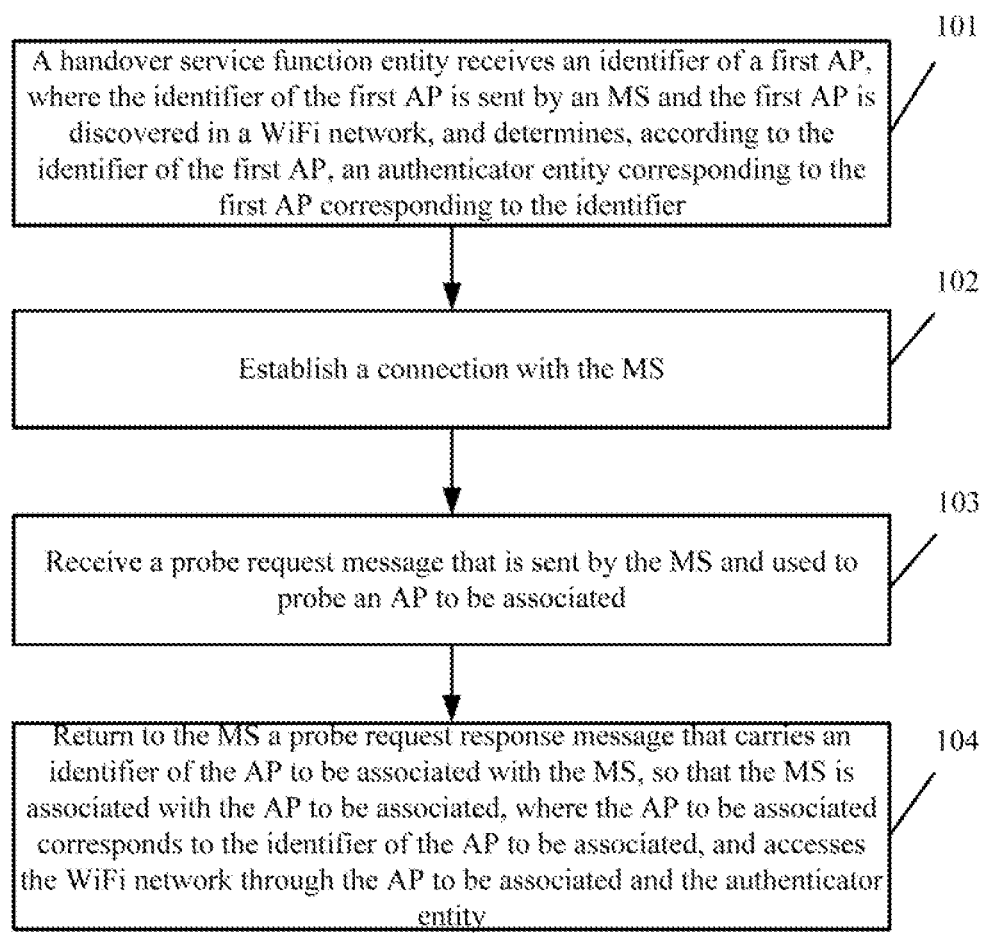
FIG. 1 is a flowchart of a processing method supporting handover according to a first embodiment of the present invention.

FIG. 1 is a flowchart of a processing method supporting handover according to a first embodiment of the present invention. The method includes the following steps:

Step 101: A handover service function entity receives an identifier of a first AP, where the identifier of the first AP is sent by an MS and the first AP is discovered in a WiFi network, and determines, according to the identifier of the first AP, an authenticator entity corresponding to the first AP corresponding to the identifier.

Step 102: Establish a connection with the MS.

Step 101 and step 102 do not have a sequence relationship.

Step 103: Receive from the MS a probe request message for probing an AP to be associated.

Step 104: Return to the MS a probe request response message that carries an identifier of the AP to be associated with the MS, so that the MS is associated with the AP to be associated, where the AP to be associated corresponds to the identifier of the AP to be associated, and accesses the WiFi network through the AP to be associated and the authenticator entity.

The identifier of the first AP, where the identifier of the first AP is sent by the MS and received by the handover service function entity and the first AP is discovered in the WiFi network, is the identifier of the first AP, where the identifier of the first AP is sent by the MS to a first server; and after an address of the handover service function entity that corresponds to the identifier of the first AP and is determined by the first server according to a preset mapping relationship between the identifier of the first AP and the handover service function entity is received, the identifier is sent to the handover service function entity according to the address.

When the first AP is a thin AP, the handover service function entity is a handover service function entity serving a thin-AP-based network, and the identifier of the AP to be associated is an identifier of the thin AP simulated by the handover service function entity; and the returning to the MS the probe request response message that carries the identifier of the AP to be associated with the MS may be specifically: returning to the MS the probe request response message that carries the identifier of the thin AP simulated by the handover service function entity.

Or, when the first AP is a fat AP, the handover service function entity is a handover service function entity serving a fat-AP-based network, and the identifier of the AP to be associated is the identifier of the first AP; and the returning to the MS the probe request response message that carries the identifier of the AP to be associated with the MS may be specifically: forwarding, by the handover service function entity, to the first AP the probe request message sent by the MS, and forwarding to the MS the probe request response message that is returned by the first AP and carries the identifier of the first AP.

The returning to the MS the probe request response message that carries the identifier of the AP to be associated with the MS may also specifically be:

returning, by the handover service function entity, the probe request response message to the MS according to the deployment type, and when the deployment type is a thin-AP-based network deployment type and the identifier of the AP to be associated is the identifier of the thin AP simulated by the handover service function entity, returning, by the handover service function entity, to the MS the probe request response message that carries the identifier of the thin AP simulated by the handover service function entity; or when the deployment type is a fat-AP-based network deployment type and the identifier of the AP to be associated is the identifier of the first AP, forwarding, by the handover service function entity, to the first AP the probe request message sent by the MS, and forwarding to the MS the probe request response message returned by the first AP.

It can be seen from this embodiment that, in the technical solution according to the embodiment of the present invention, the handover service function entity receives the identifier of the first AP, where the identifier of the first AP is sent by the MS and the first AP is discovered in the WiFi network, and determines, according to the identifier of the first AP, an authenticator entity corresponding to the first AP corresponding to the identifier; after establishing the connection with the MS, receives the probe request message that is sent by the MS and used to probe the AP to be associated; and returns to the MS the probe request response message that carries the identifier of the AP to be associated with the MS, so that the MS is associated with the AP to be associated, where the AP to be associated corresponds to the identifier of the AP to be associated, and accesses the WiFi network through the AP to be associated and the authenticator entity. Through such processing procedures, great changes do not need to be performed on an existing network during the network handover, and network deployment is simple.

Figure 2:
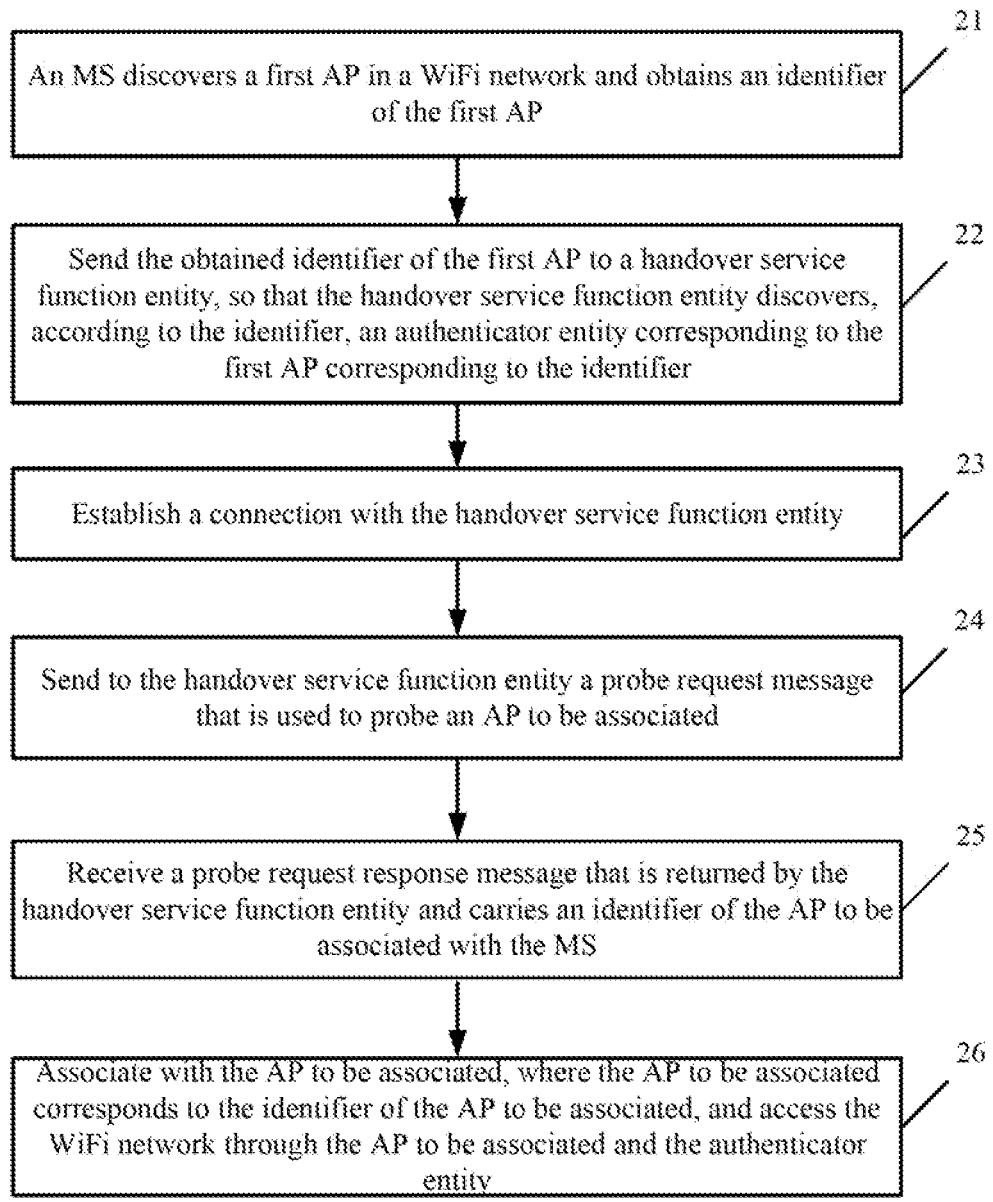
FIG. 2 is a flowchart of a processing method supporting handover according to a second embodiment of the present invention.

FIG. 2 is a flowchart of a processing method supporting handover according to a second embodiment of the present invention. The method includes the following steps:

Step 21: An MS discovers a first AP in a WiFi network, and obtains an identifier of the first AP.

Step 22: Send the obtained identifier of the first AP to a handover service function entity, so that the handover service function entity discovers, according to the identifier, an authenticator entity corresponding to the first AP corresponding to the identifier.

Step 23: Establish a connection with the handover service function entity.

Step 22 and step 23 do not have a sequence relationship.

Step 24: Send to the handover service function entity a probe request message that is used to probe an AP to be associated.

Step 25: Receive a probe request response message that is returned by the handover service function entity and carries an identifier of the AP to be associated with the MS.

Step 26: Associate with the AP to be associated, where the AP to be associated corresponds to the identifier of the AP to be associated, and access the WiFi network through the AP to be associated and the authenticator entity.

It can be seen from this embodiment that, in the technical solution according to this embodiment, the MS sends the obtained identifier of the first AP in the WiFi network to the handover service function entity, so that the handover service function entity discovers, according to the identifier, an authenticator entity corresponding to the first AP corresponding to the identifier; after establishing the connection with the handover service function entity, sends to the handover service function entity the probe request message that is used to probe the AP to be associated; receives the probe request response message that is returned by the handover service function entity and carries the identifier of the AP to be associated with the MS; and associates with the AP to be associated, where the AP to be associated corresponds to the identifier of the AP to be associated, and accesses the WiFi network through the AP to be associated and the authenticator entity. Through such processing procedures, great changes do not need to be performed on the existing network during the network handover, and network deployment is simple.

The technical solutions according to the embodiments of the present invention are described in detail in the following with reference to a third and fourth embodiments.

In the following description, a WiFi single radio handover service function entity (WiFi SFF) is taken as an example of the handover service function entity, a basic service set identifier (BSSID, Basic Service Set Identifier) of the AP is taken as an example of the identifier of the AP, and a single radio MS is taken as an example of the MS (MS, Mobile Station). In addition, in the following description, a scenario where the MS hands over from a non-WiFi network to a WiFi network is taken as an example. The non-WiFi network may be a WiMAX network or a 3GPP2 network, which is not limited in the present invention.

To sum up, the technical solution according to the embodiment of the present invention is as follows: When an MS attaches to a WiMAX network, a target AP in an available WiFi network in the neighborhood is discovered through a WiFi radio receiving unit of the MS, or a currently available target AP in the neighborhood is obtained through the network to which the MS attaches currently and from a network topology information server, and meanwhile, the BSSID of the target AP is obtained; the BSSID of the AP is notified to the WiFi SFF; the WiFi SFF discovers a target network and a target network type according to the BSSID of the AP, where the discovering the target network may be discovering an address of the authenticator entity in the target network or an address of the AP itself in the target network, and establishes a connection with a network entity of the discovered address. The established connection may be a tunnel connection. The WiFi SFF maps the connection established between the WiFi SFF and the MS to the connection established between the WiFi SFF and the target network, so that signaling such as the network access and handover from different MSs are forwarded to the entities in their respective target networks.

Embodiment 3

The third embodiment provides different WiFi SFFs for WiFi networks of different deployment types (thin AP/fat AP). The third embodiment provides two different WiFi SFFs implementing different functions, which are respectively a forwarding WiFi SFF which is directed to a fat-AP-based network, and provides a signaling forwarding function only, and a simulating WiFi SFF which is directed to a thin-AP-based network and provides a function of simulating a thin AP.

Figure 3A:
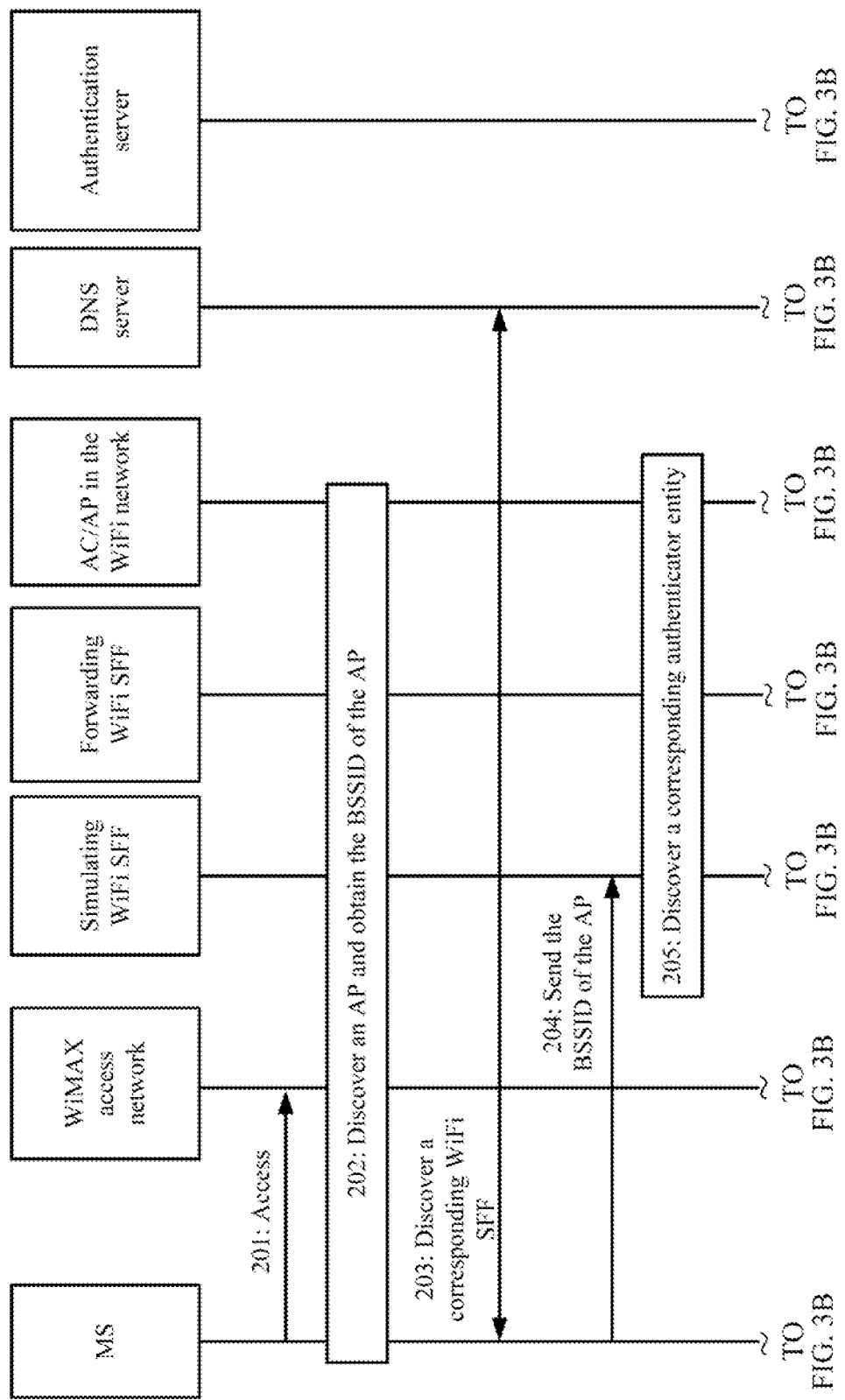
FIG. 3A and FIG. 3B are a flowchart of a processing method supporting handover according to a third embodiment of the present invention.
Figure 3B:
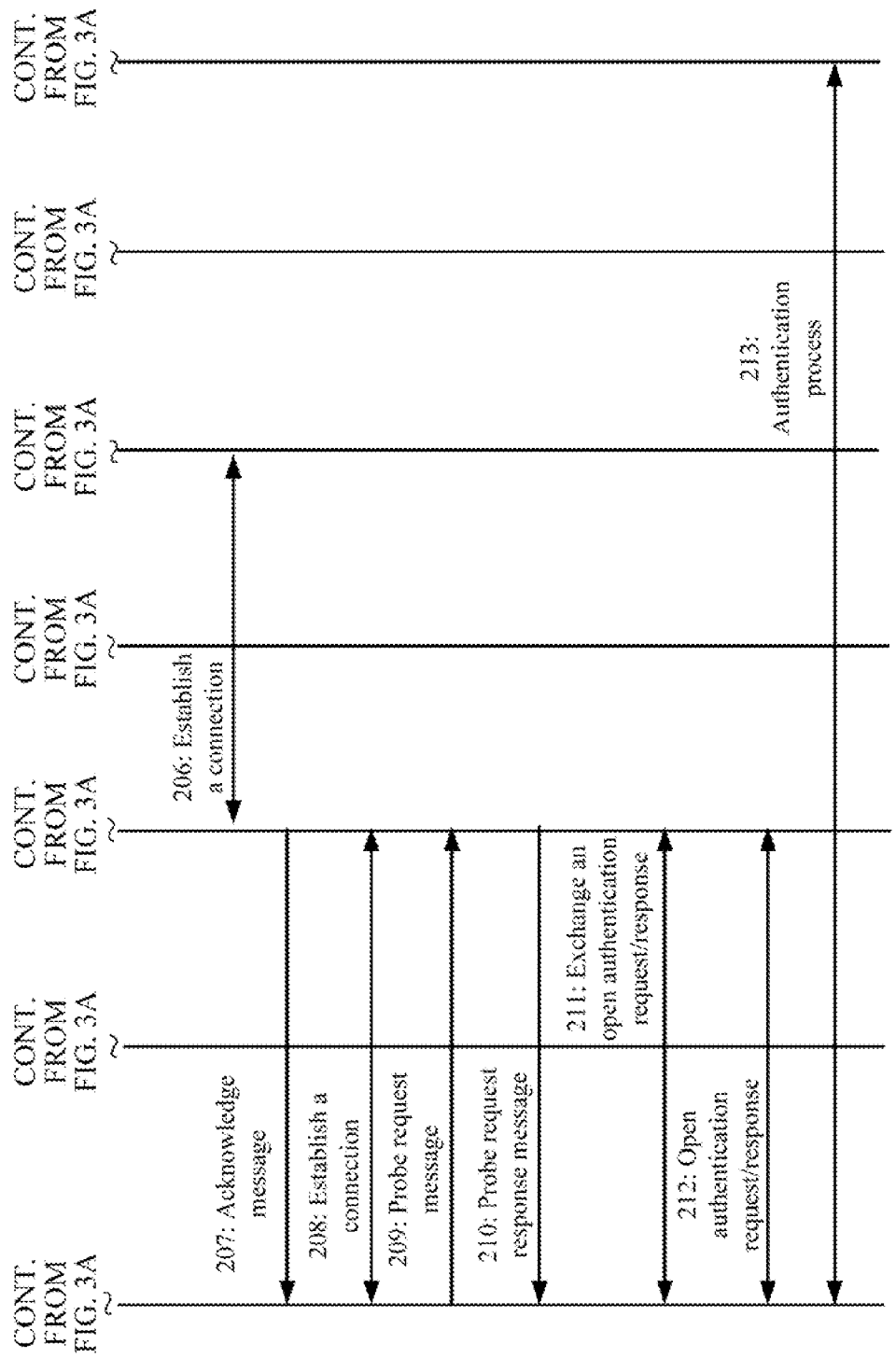

FIG. 3A and FIG. 3B are a flowchart of a processing method supporting handover according to a third embodiment of the present invention. The method includes the following steps:

Step 201: An MS connects to a WiMAX network through WiMAX radio, and obtains a service through the current WiMAX network.

Step 202: The MS, while obtaining the service through the current WiMAX network, discovers an available AP in a WiFi network in the neighborhood by using a WiFi radio receiving unit, determines an AP having a better signal, and obtains the BSSID of the AP.

Step 203: The MS discovers, according to the obtained BSSID of the AP, a WiFi SFF configured for the WiFi network and used for single radio handover.

In this step, the MS may send a request carrying the BSSID of the AP to a server, receive address information, for example, IP address information, of the WiFi SFF corresponding to the BSSID of the AP, where the address information of the WiFi SFF corresponding to the BSSID of the AP is detected by the server according to a set mapping relationship between the BSSID of the AP and the address of the WiFi SFF, and the MS determines a corresponding WiFi SFF according to the address information.

Specifically, the MS may use a DNS protocol. The MS generates a uniform resource locator (URL, Uniform Resource Locator), which carries character string information corresponding to the BSSID of the AP. The MS sends a DNS query request to a DNS server (DNS Server, Domain Name System Server). The query request carries the generated URL. The DNS server pre-configures a mapping relationship between the BSSID of the AP included in the WiFi network and the IP address of the WiFi SFF serving the WiFi network. The DNS server returns the IP address of the WiFi SFF to the MS according to the query request.

It should be noted that the DSN server is taken as an example for illustration here. The mapping relationship between the BSSID of the AP and the WiFi SFF may also be preset on another server (for example, a DHCP server). In this case, the MS may query another server.

When the mapping relationship between the BSSID of the AP or the URL generated from the BSSID and the corresponding WiFi SFF is configured on the server, for example, a DNS server, in a thin-AP-based network, the BSSID of the AP or the URL generated from the BSSID of the thin AP corresponds to the IP address of the SFF serving the thin-AP-based network specifically; in a fat-AP-based network, the BSSID of the AP or the URL generated from the BSSID of the AP corresponds to the IP address of the SFF serving the fat-AP-based network specifically. Therefore, the MS may discover a correct IP address of the SFF according to the BSSID of the AP.

Step 204: The MS notifies the discovered WiFi SFF of the BSSID of the AP in the WiFi network.

In this step, the MS may also send a medium access control (MAC, Medium Access Control) address of the MS to the WiFi SFF.

Step 205: The WiFi SFF discovers a corresponding authenticator entity according to the BSSID of the AP in the WiFi network.

The WiFi SFF discovers a corresponding authenticator entity address in the WiFi network according to the BSSID of the AP in the WiFi network. In a thin-AP-based WiFi network, the authenticator entity may be an access controller (AC, Access Controller), that is, a controller in the thin-AP-based WiFi network. In a fat-AP-based WiFi network, the authenticator entity may be a fat AP.

The WiFi SFF may discover the corresponding authenticator entity in the WiFi network by using a discovery protocol, for example, the DNS protocol.

Step 206: The WiFi SFF establishes a connection with the discovered authenticator entity.

The WiFi SFF establishes a connection with the discovered AC or fat AP in a target network, and this connection may be a tunnel connection. This connection may be statically established in advance. If a statically-established connection exists, this step may be unnecessary.

Step 207: The WiFi SFF sends an acknowledge message to the MS.

The acknowledge message in this step is in response to the BSSID of the AP, where the BSSID of the AP is sent by the MS in step 204, which indicates that the operations in steps 205 and 206 are performed successfully. The acknowledge message may also indicate the status of the connection establishment between the WiFi SFF and the AC in the target network or the fat AP in the target network. If the BSSID of the AP sent by the MS is unavailable, this message indicates a result that the BSSID of the AP is unavailable. Subsequently, the MS may resend the BSSID of another AP.

This step is optional.

Step 208: The MS establishes a connection with the WiFi SFF.

The MS establishes an IP tunnel connection with the WiFi SFF. This step may also be performed before step 204 or 205. That is, the connection between the MS and the WiFi SFF may be established before or after the connection between the WiFi SFF and the AC in the target network or the fat AP in the target network is established.

It can be seen that there are two connections from the MS to the authenticator entity (AC or fat AP). When handover of multiple MSs exists concurrently, multiple connections exist no matter from the WiFi SFF to the MS and from the WiFi SFF to the authenticator entity. To ensure that messages from different MSs can be correctly forwarded to the authenticator entity, the WiFi SFF needs to establish a correct mapping relationship between the connection from the MS to the WiFi SFF and from the connection from the WiFi SFF to the authenticator entity.

The embodiment of the present invention uses the following solution: The WiFi SFF identifies the mapping relationship between the two connections by using a MAC address of the MS, where the MAC address of the MS is received from the MS, and the BSSID of the authenticator entity. For example, the connection established between an MS 1 and a simulating WiFi SFF is marked as [MAC1, BSSID1], where the MAC1 indicates the MAC address of the MS 1 and the BSSID1 is the BSSID of the authenticator entity; and the connection established between the WiFi SFF and the authenticator entity is marked as [MAC1, BSSID1]. The MS has a unique MAC address, and therefore the mapping relationship between the two connections is ensured.

It should be noted that the connection from the MS to the WiFi SFF varies for different MSs. However, the connection from the WiFi SFF to the authenticator entity may be a connection that multiple MSs correspond to a same one. That is, one connection from the WiFi SFF to the authenticator entity may have multiple identifiers.

In addition, if the mapping relationship between the connection from the MS to the WiFi SFF and the connection from the WiFi SFF to the authenticator entity does not depend on the MAC address of the MS for implementation, the MS does not need to send the MAC address of the MS to the WiFi SFF.

It should also be noted that the foregoing is for illustration only. Other methods may also be used to obtain the mapping relationship between two connections.

Step 209: The MS broadcasts, through the established connection, to the WiFi SFF a probe request (Probe Request) message that is used to probe the AP to be associated.

Step 210: The MS receives a probe request response message (Probe Response) from the WiFi SFF through the established connection.

The simulating WiFi SFF simulating the thin AP has its own BSSID. Therefore, after receiving the probe request message, the simulating WiFi SFF directly sends a probe request response message to the MS and carries the BSSID of the simulating WiFi SFF in the response message.

The forwarding WiFi SFF forwards a message only between the MS and a target WiFi network. Therefore, after receiving the Probe Request message, the forwarding WiFi SFF forwards the message to the target network, that is, the fat AP. After receiving the Probe Response message that is returned by the fat AP in the target network and carries the BSSID of the fat AP in the target network, the forwarding WiFi SFF forwards the response message to the MS.

Subsequently, the MS uses the BSSID in the Probe Response message as the identifier of the AP to be associated, namely, a target AP in initial network access, and interacts with the AP identified by the identifier in the Probe Response.

Step 211: The MS exchanges an open authentication request (Open Authentication Request) message/open authentication response (Open Authentication Response) message with the target AP in initial network access through the established connection.

Step 212: The MS exchanges an authentication request (Authentication Request) message/authentication response (Authentication Response) message with the target AP in initial network access through the established connection.

Step 213: The MS completes an extensible authentication protocol (EAP, Extensible Authentication Protocol) authentication process with the target AP in initial network access through the established connection.

The authentication server is required to participate in this process. During the EAP authentication process, the MS and the authentication server generate a main session key (MSK, Master Session Key). According to the protocol, the first 256 bits of the MSK are used as a pairwise master key (PMK, Pairwise Master Key) for the MS and the authentication server. The authentication server sends the PMK to the authenticator. In the subsequent handover, the MS may directly use the generated PMK.

After the foregoing procedures are complete, when the MS needs to hand over to the WiFi network subsequently, if the WiMAX radio unit is disabled and then a WiFi radio unit is enabled, the WiFi radio unit may implement handover directly based on the operations completed in the foregoing procedures.

It can be seen that in the foregoing procedures, regardless of whether the MS discovers a simulating WiFi SFF or a forwarding WiFi SFF, the MS implements exactly the same interaction process, which completely complies with the 802.11 protocol and therefore has good applicability.

It can be seen from this embodiment that, the embodiment of the present invention provides a network interoperability solution where the simulating, WiFi SFF and the forwarding WiFi SFF are simultaneously deployed on the network for supporting single radio handover. The forwarding WiFi SFF implementing only the signaling forwarding function is more applicable to a fat-AP-based network, which avoids complex operations during handover or avoids complex upgrade of the fat AP. The simulating WiFi SFF is more applicable to a thin-AP-based network, which requires few changes to a thin-AP-based WiFi network and therefore is more applicable to the thin-AP-based WiFi network. Before the MS hands over from a WiMAX network to a WiFi network, the WiFi SFF has established a connection from the MS to the target AP according to the BSSID of the target AP in the WiFi network, where the BSSID of the target AP in the WiFi network is sent by the MS, receives the probe request message that is sent by the MS and used to probe the AP to be associated, and returns to the MS the probe request response message that carries the identifier of the AP to be associated with the MS. The returned identifier of the AP to be associated varies according to different network types of the WiFi network. In this way, processing is implemented by taking different types of the WiFi network into consideration. Therefore, great changes do not need be performed on an existing network and network deployment is simple. In addition, for the MS, the MS does not need to distinguish different network types but performs the same procedures. The procedures are completely the same. The WiFi SFF adopts different working modes in different target networks. Therefore, in the thin-APbased WiFi network, only the AC needs to be upgraded and the thin AP in the network does not need to be upgraded, which reduce changes to an existing WiFi network to the minimum. The fat AP only supports to establish a connection with the WiFi SFF and few changes are required.

Embodiment 4

The fourth embodiment provides a unified WiFi SFF for WiFi networks of different deployment types (thin AP/fat AP). The unified WiFi SFF includes two function modules, which are respectively a forwarding WiFi SFF module which is directed to a fat-AP-based network, and provides a signaling forwarding function only; and a simulating WiFi SFF module which is directed to a thin-AP-based network and provides a function of simulating a thin AP.

The main difference between the fourth embodiment and the third embodiment is that: After obtaining a BSSID of an AP in a target network, the WiFi SFF first needs to discover, according to the BSSID of the AP, whether the target network is a thin-AP-based network or a fat-AP-based network, and determine which function module is used to implement a corresponding function.

Figure 4A:
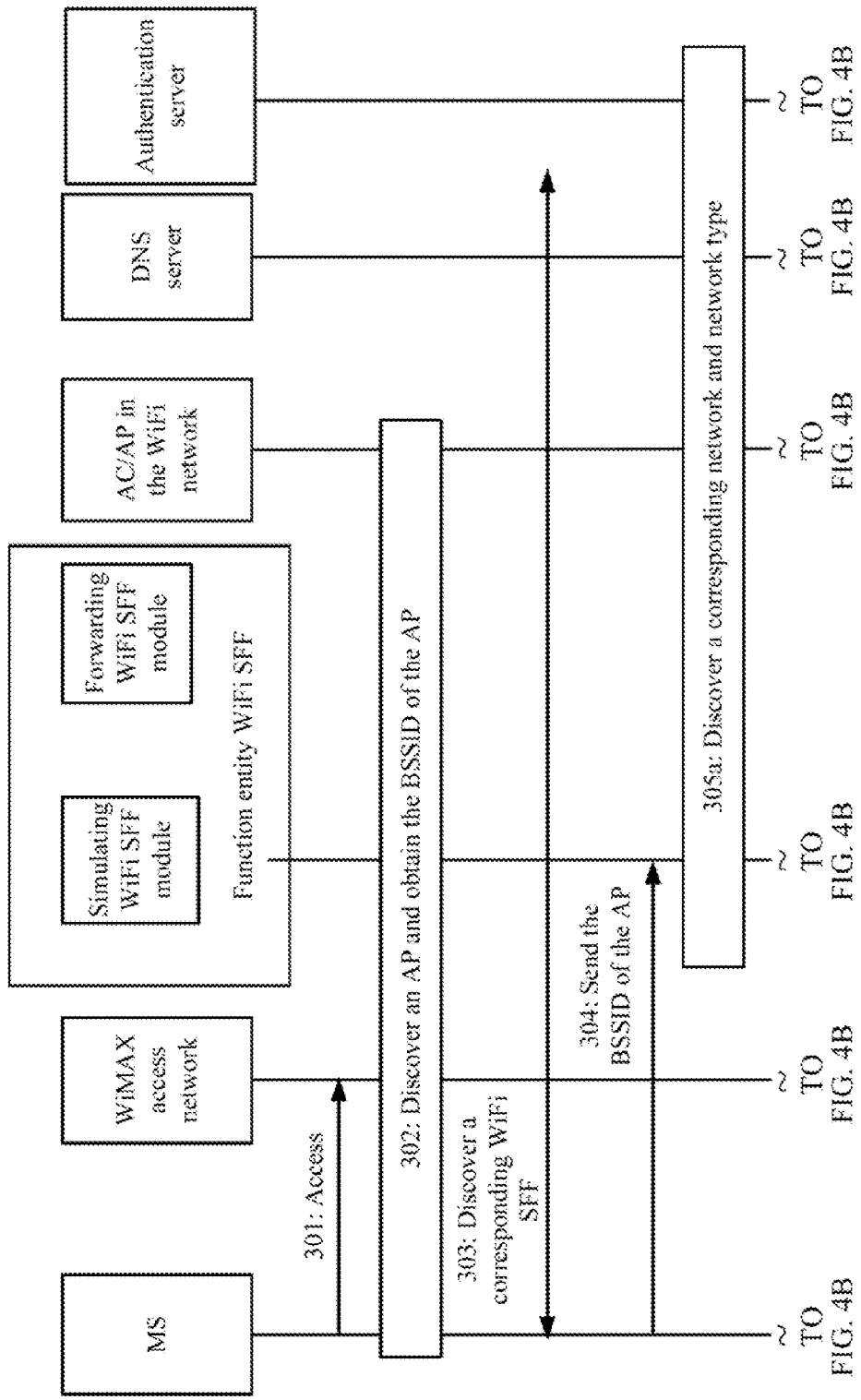
FIG. 4A and FIG. 4B are a flowchart of a processing method supporting handover according to the third embodiment of the present invention.
Figure 4B:
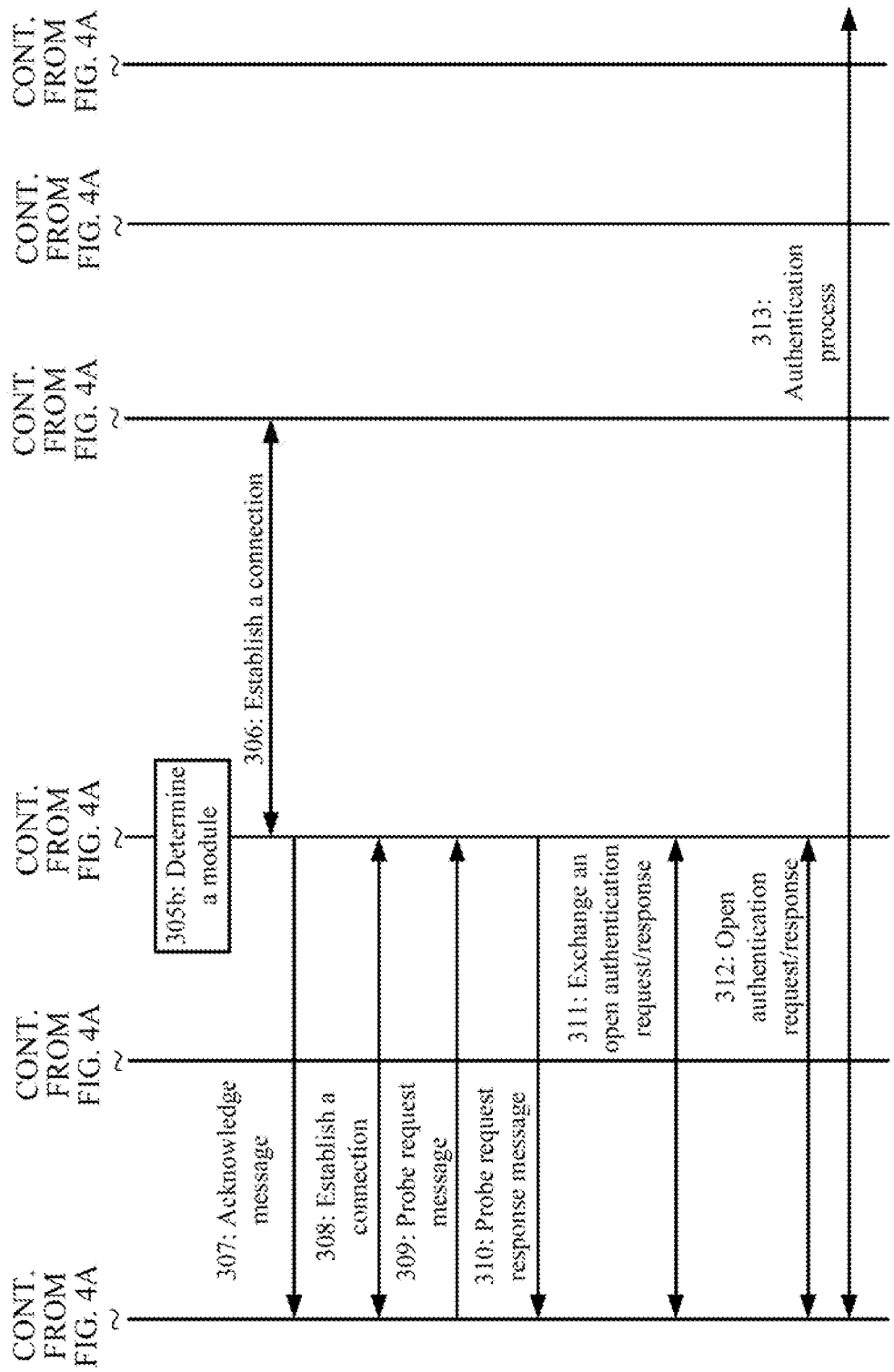

FIG. 4A and FIG. 4B are a flowchart of a processing method supporting handover according to a fourth embodiment of the present invention. The method includes the following steps:

Step 301: An MS connects to a WiMAX network through WiMAX radio, and obtains a service through the current WiMAX network.

Step 302: The MS, while obtaining the service through the current WiMAX network, discovers an available AP in a WiFi network in the neighborhood by using a WiFi radio receiving unit, determines an AP having a better signal, and obtains the BSSID of the AP.

Step 303: The MS discovers, according to the obtained BSSID of the AP, a WiFi SFF configured for the WiFi network and used for single radio handover.

For details about this step, reference may be made to the description in step 203 in the third embodiment. What is different is that: According to this embodiment, a unified WiFi SFF integrating two function modules is discovered.

Step 304: The MS notifies the discovered WiFi SFF of the BSSID of the AP in the WiFi network.

In this step, the MS may also send a MAC address of the MS to the WiFi SFF.

Step 305a: The WiFi SFF discovers, according to the BSSID of the AP in the WiFi network, a target WiFi network and determines whether the network type of the target WiFi network is a thin-AP-based network or a fat-AP-based network.

For the process of discovering the target network, reference may be made to the description in step 205 in the third embodiment.

The discovery of the network type of the WiFi network may be implemented by using a DHCP protocol or another similar protocol. A mapping relationship between the BSSID of the AP in the WiFi network and the network type of the WiFi network where the AP is located is saved on a DHCP server, and the mapping relationship may be saved in a data table. The WiFi SFF carries the BSSID of the AP in an option of a DHCP request message and sends the message to the DHCP server. After obtaining the BSSID of the AP in the message, the DHCP server determines the network type corresponding to the BSSID of the AP according to the mapping relationship between the BSSID of the AP and the network type of the WiFi network where the AP is located, and carries the network type corresponding to the BSSID of the AP in an option of a DHCP response message and sends the message to the WiFi SFF. In this way, the WiFi SFF may know the network type corresponding to the BSSID of the AP.

It should be noted that the DHCP server is taken as an example for illustration here. The mapping relationship between the BSSID of the AP in the WiFi network and the network type of the WiFi network where the AP is located may be pre-stored on a server supporting another protocol, and the WiFi SFF may query another server.

Step 305b: According to the discovered target network type corresponding to the BSSID of the AP, the WiFi SFF selects a function module to implement the function.

If the WiFi SFF discovers that the network type corresponding to the BSSID of the AP is a thin-AP-based network, the WiFi SFF selects a simulating WiFi SFF module to execute the function. It should be noted that if the WiFi SFF discovers that the network type corresponding to the BSSID of the AP is a fat-AP-based network, the WiFi SFF selects a forwarding WiFi SFF module to implement the function.

Step 306: The WiFi SFF establishes a connection with an authenticator entity corresponding to the BSSID of the target AP.

In a thin-AP-based WiFi network, the authenticator entity may be an access controller (AC, Access Controller), that is, a controller in the thin-AP-based WiFi network. In the fat-AP-based WiFi network, the authenticator entity may be a fat AP. The WiFi SFF establishes a connection with the AC in the discovered target network or fat AP in the discovered target network, and this connection may be a tunnel connection. This connection may be statically established in advance. If a statically-established connection exists, this step may be unnecessary.

Steps 307 to 309 are the same as steps 207 to 209 in the third embodiment and are not detailed here.

Step 310: The MS receives a probe request response message (Probe Response) from the WiFi SFF through the established connection.

After receiving the probe request message, the WiFi SFF may find, according to the MAC address of the MS in the message or other information, the deployment type of the network where the target AP is located, where the deployment type of the network where the target AP is located is designated by the MS and discovered in the preceding steps, and implement functions of different function modules according to the deployment type of the target network.

In the thin-AP-based target network, the SFF implements a thin AP simulating module and uses the BSSID of the SFF. Therefore, after the WiFi SFF receives the probe request message, the thin AP simulating module directly sends the probe request response message to the MS and carries the BSSID of the WiFi SFF in the response message.

In the fat-AP-based target network, the WiFi SFF implements a signaling forwarding module, and forwards a message only between the MS and the target WiFi network. Therefore, after the WiFi SFF receives the probe request message, the signaling forwarding module forwards the message to the target network, that is, the fat AP. After receiving the Probe Response message that is returned by the fat AP in the target network and carries the BSSID of the fat AP in the target network, the signaling forwarding module forwards the response message to the MS.

Subsequently, the MS uses the BSSID in the Probe Response message as the AP to be associated, namely, a target AP in initial network access, and interacts with the AP.

Steps 311 to 313 are basically the same as steps 211 to 213 in the third embodiment. The simulating WiFi SFF module in the fourth embodiment is equivalent to the simulating WiFi SFF in the third embodiment; the forwarding WiFi SFF module in the fourth embodiment is equivalent to the forwarding WiFi SFF in the third embodiment. Reference may be made to the preceding description for detailed procedures, which are not repeatedly described here.

After the foregoing procedures are complete, when the MS needs to hand over to the WiFi network subsequently, if the WiMAX radio unit is disabled and then a WiFi radio unit is enabled, the WiFi radio unit may implement handover by directly using the operations completed in the foregoing procedures.

This embodiment implements basically the same function as the third embodiment. In addition, a unified WiFi SFF is used so that another implementation method is provided to meet the requirements of different scenarios.

Detailed above is a processing method supporting handover according to the embodiments of the present invention. Correspondingly, embodiments of the present invention provides a communication apparatus and a communication system.

Figure 5:
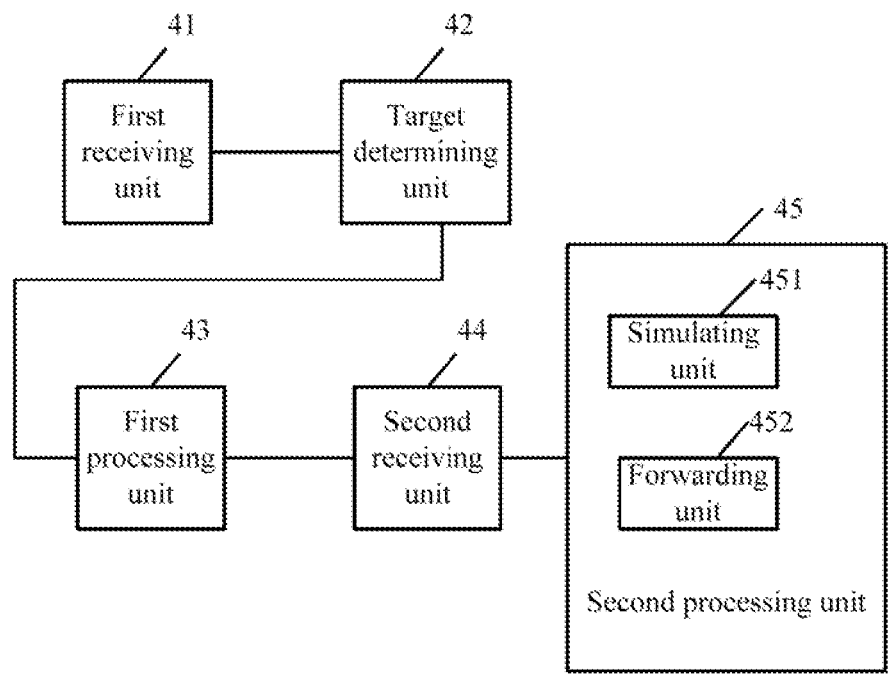
FIG. 5 is a first schematic structural diagram of a communication apparatus according to an embodiment of the present invention.

FIG. 5 is a first schematic structural diagram of a communication apparatus according to an embodiment of the present invention. The communication apparatus may be a handover service function entity, for example, a radio WiFi single radio handover service function entity (for example, WiFi SFF).

As shown in FIG. 5, the communication apparatus includes:

a first receiving unit 41, configured to receive an identifier of a first AP, where the identifier of the first AP is sent by an MS and the first AP is discovered in a WiFi network;

a target determining unit 42, configured to determine, according to the identifier of the first AP, an authenticator entity corresponding to the first AP corresponding to the identifier;

a first processing unit 43, configured to establish a connection with the MS;

a second receiving unit 44, configured to receive a probe request message that is sent by the MS and used to probe an AP to be associated; and a second processing unit 45, configured to return to the MS a probe request response message that carries an identifier of the AP to be associated with the MS, so that the MS is associated with the AP to be associated, where the AP to be associated corresponds to the identifier of the AP to be associated, and accesses the WiFi network through the AP to be associated and the authenticator entity.

The second processing unit 45 includes a simulating unit 451 and a forwarding unit 452, where:

the simulating unit 451 is configured to return to the MS the probe request response message that carries an identifier of a thin AP simulated by the handover function entity when the first AP is a thin AP, the communication apparatus is a handover service function entity serving a thin-AP-based network, and the identifier of the AP to be associated is the identifier of the thin AP simulated by the handover service function entity; and the forwarding unit 452 is configured to forward to the first AP the probe request message sent by the MS, and forward to the MS the probe request response message that is returned by the first AP and carries the identifier of the first AP when the first AP is a fat AP, the communication apparatus is a handover service function entity serving a fat-AP-based network, and the identifier of the AP to be associated is the identifier of the first AP.

Alternatively, the second processing unit 45 includes a simulating unit 451 and a forwarding unit 452, where:

the simulating unit 451 is configured to return the probe request response message that carries the identifier of the thin AP simulated by the handover service function entity to the MS when the WiFi network is a thin-AP-based network deployment type, the communication apparatus is a handover service function entity, and the identifier of the AP to be associated is the identifier of the thin AP simulated by the handover service function entity; and, the forwarding unit 452 is configured to forward to the first AP the probe request message sent by the MS, and forward to the MS the probe request response message returned by the first AP when the WiFi network is a fat-AP-based network deployment type, the communication apparatus is a handover service function entity, and the identifier of the AP to be associated is the identifier of the first AP.

The target determining unit 42 is further configured to send the identifier of the first AP to a server, and receive a deployment type of the WiFi network where the first AP is located, where the deployment type of the WiFi network where the first AP is located is determined by the server according to a preset mapping relationship between the identifier of the first AP and the deployment type of the network.

Figure 6:
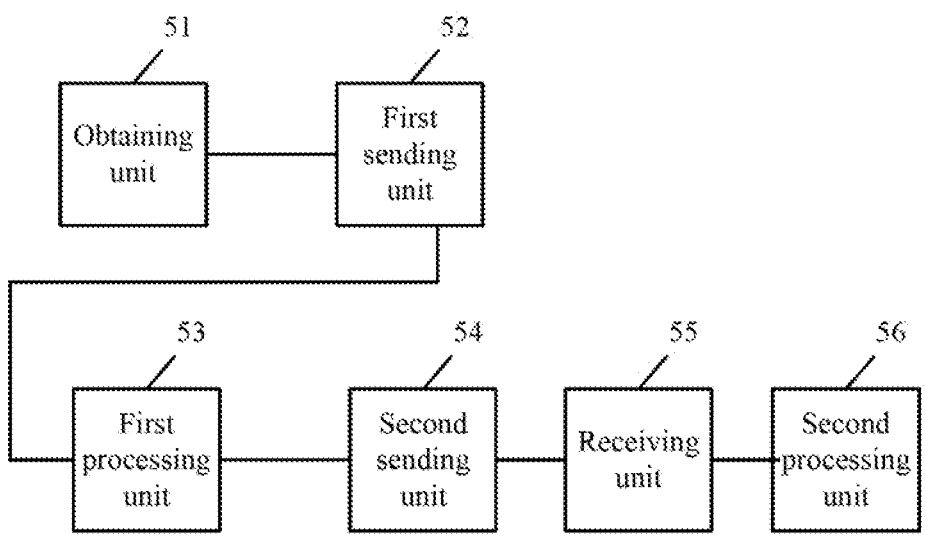
FIG. 6 is a second schematic structural diagram of a communication apparatus according to an embodiment of the present invention.

FIG. 6 is a second schematic structural diagram of a communication apparatus according to an embodiment of the present invention. The communication apparatus may be an MS.

As shown in FIG. 6, the communication apparatus includes:

an obtaining unit 51, configured to discover a first AP in a WiFi network and obtain an identifier of the first AP;

a first sending unit 52, configured to send the obtained identifier of the first AP to a handover service function entity, so that the handover service function entity determines, according to the identifier, an authenticator entity corresponding to the first AP corresponding to the identifier;

a first processing unit 53, configured to establish a connection with the handover service function entity;

a second sending unit 54, configured to send to the handover service function entity a probe request message that is used to probe an AP to be associated;

a receiving unit 55, configured to receive a probe request response message that is returned by the handover service function entity and carries an identifier of the AP to be associated with an MS; and a second processing unit 56, configured to associate with the AP to be associated, where the AP to be associated corresponds to the identifier of the AP to be associated, and access the WiFi network through the AP to be associated and the authenticator entity.

The receiving unit 55 may be configured to receive the probe request response message that is returned by the handover service function entity to the MS and carries an identifier of a thin AP simulated by the handover service function entity when the first AP is a thin AP, the handover service function entity is a handover service function entity serving a thin-AP-based network, and the identifier of the AP to be associated is the identifier of the thin AP simulated by the handover service function entity; or the receiving unit 55 may be configured to receive the probe request response message forwarded by the handover service function entity to the MS after the handover service function entity forwards to the first AP the probe request message sent by the MS and receives the probe request response message which is returned by the first AP and carries the identifier of the first AP when the first AP is a fat AP, the handover service function entity is a handover service function entity serving a fat-AP-based network, and the identifier of the AP to be associated is the identifier of the first AP.

Alternatively, the receiving unit 55 may be configured to receive the probe request response message that is returned by the handover service function entity to the MS and carries the identifier of the thin AP simulated by the handover service function entity when the WiFi network is a thin-AP-based network deployment type and the identifier of the AP to be associated is the identifier of the thin AP simulated by the handover service function entity; or the receiving unit 55 may be configured to receive the probe request response message that is forwarded by the handover service function entity to the MS and carries the identifier of the first AP after the handover service function entity forwards to the first AP the probe request message sent by the MS and receives the probe request response message which is returned by the first AP and carries the identifier of the first AP when the WiFi network is a fat-AP-based network deployment type and the identifier of the AP to be associated is the identifier of the first AP.

Figure 7:
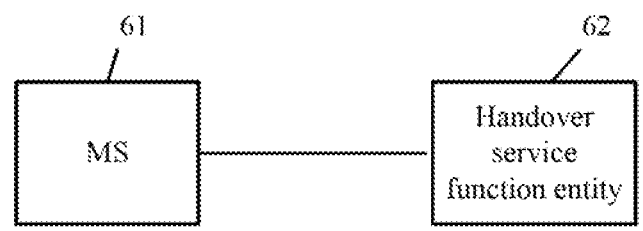
FIG. 7 is a schematic structural diagram of a communication system according to an embodiment of the present invention.

FIG. 7 is a schematic structural diagram of a communication system according to an embodiment of the present invention.

As shown in FIG. 7, the communication system includes an MS 61 and a handover service function entity 62.

The MS 61 is configured to: discover a first AP in a WiFi network and obtain an identifier of the first AP; send the obtained identifier of the first AP to the handover service function entity 62, so that the handover service function entity 62 determines, according to the identifier, an authenticator entity corresponding to the first AP corresponding to the identifier; establish a connection with the handover service function entity 62; send to the handover service function entity 62 a probe request message that is used to probe an AP to be associated; receive a probe request response message that is returned by the handover service function entity 62 and carries an identifier of the AP to be associated with the MS 61; associate with the AP to be associated, where the AP to be associated corresponds to the identifier of the AP to be associated, and access the WiFi network through the AP to be associated and the authenticator entity.

The handover service function entity 62 is configured to: receive the identifier of the first AP, where the identifier of the first AP is sent by the MS 61 and the first AP is discovered in the WiFi network; determine, according to the identifier of the first AP, the authenticator entity corresponding to the first AP corresponding to the identifier; establish a connection with the MS 61; receive the probe request message that is sent by the MS 61 and is used to probe the AP to be associated; and return to the MS 61 the probe request response message that carries the identifier of the AP to be associated with the MS 61.

The handover service function entity 62 returns to the MS 61 the probe request response message that carries an identifier of a thin AP simulated by the handover service function entity 62, when the first AP is a thin AP, the handover service function entity 62 is a handover service function entity 62 serving a thin-AP-based network, and the identifier of the AP to be associated is the identifier of the thin AP simulated by the handover service function entity 62; or the handover service function entity 62 forwards to the first AP the probe request message sent by the MS 61, and forwards to the MS 61 the probe request response message that is returned by the first AP and carries the identifier of the first AP when the first AP is a fat AP, the handover service function entity is a handover service function entity 62 serving a fat-AP-based network, and the identifier of the AP to be associated is the identifier of the first AP.

Alternatively, the handover service function entity 62 returns the probe request response message to the MS 61 according to the deployment type of the discovered network; and when the deployment type is a thin-AP-based network deployment type and the identifier of the AP to be associated is the identifier of the thin AP simulated by the handover service function entity, the handover service function entity 62 returns to the MS 61 the probe request response message that carries the identifier of the thin AP simulated by the handover service function entity 62; or when the deployment type is a fat-AP-based network deployment type and the identifier of the AP to be associated is the identifier of the first AP, the handover service function entity 62 forwards to the first AP the probe request message sent by the MS 61, and forwards to the MS 61 the probe request response message that is returned by the first AP and carries the identifier of the first AP.

The handover service function entity 62 has the structure as shown in the foregoing FIG. 5, and the MS 61 has the structure as shown in the foregoing FIG. 6. Reference may be made to the foregoing description for details, which are not repeatedly described here.

It should be noted that the information interaction and execution process between units of the foregoing devices and systems are based on the same conception as the method embodiments of the present invention. Reference may be made to the description of the method embodiments of the present invention for details, which are not repeatedly described here.

Persons of ordinary skill in the art may understand that all or part of the steps in the methods of the foregoing embodiments may be implemented by a program instructing relevant hardware. The program may be stored in a computer readable storage medium. The storage medium may be a read only memory (ROM, Read Only Memory), a random access memory (RAM, Random Access Memory), a magnetic disk, or a compact disk.

Detailed above are the processing method supporting handover, communication apparatus, and communication system provided in the embodiments of the present invention. Exemplary embodiments are used to illustrate the principle and implementation mode of the present invention. The foregoing descriptions about the embodiments are merely intended to help understand the methods and core ideas of the present invention. Meanwhile, persons of ordinary skill in the art can make various modifications and variations to the specific implementation mode and application scope according to the ideas of the present invention. In conclusion, the contents of the specification shall not be constructed as limitations to the present invention.

What is claimed is:

1. A processing method supporting handover, comprising:
  receiving, by a first server, an identifier of a first access point (AP) from a mobile station (MS);
  determining, by the first server, an address of a handover service function entity corresponding to the identifier of the first AP, wherein the address of the handover service function entity is determined according to a preset mapping relationship between the identifier of the first AP and the address of the handover service function entity;
  sending, by the first server, the address of the handover service function entity to the MS;

receiving, by the handover service function entity, the identifier of the first AP from the MS, wherein the first AP is discovered, by the MS, in a wireless fidelity (WiFi) network;

determining, according to the identifier of the first AP, an authenticator entity corresponding to the first AP corresponding to the identifier;

establishing, by the handover service function entity, a connection with the MS;

receiving a probe request message that is sent by the MS and used to probe an AP to be associated; and returning to the MS a probe request response message that carries an identifier of the AP to be associated with the MS such that the MS associates with the AP corresponding to the identifier of the AP to be associated, and accesses the WiFi network through the AP to be associated and the authenticator entity.

2. The method according to claim 1, wherein receiving, by the handover service function entity, the identifier of the first AP from the MS comprises receiving, by the handover service function entity, the identifier of the first AP that is sent, according to the address of the handover service function entity, by the MS.

3. The method according to claim 1, further comprising determining, by the handover service function entity and according to the identifier of the first AP, a deployment type of the WiFi network wherein the first AP is located.

4. The method according to claim 1, wherein the first AP is a thin AP, wherein the thin AP utilizes a centralized authentication architecture having a unified authenticator that is located on an access controller, wherein the handover service function entity is a handover service function entity serving a thin-AP-based network, and the identifier of the AP to be associated is the identifier of the thin AP simulated by the handover function entity, and wherein returning to the MS the probe request response message that carries the identifier of the AP to be associated with the MS comprises returning to the MS the probe request response message that carries the identifier of the thin AP simulated by the handover service function entity.

5. The method according to claim 4, wherein the deployment type is a thin-AP-based network deployment type, wherein the identifier of the AP to be associated is an identifier of the thin AP simulated by the handover function entity, and wherein returning to the MS the probe request response message that carries the identifier of the AP to be associated with the MS comprises returning, by the handover service function entity, to the MS the probe request response message that carries the identifier of the thin AP simulated by the handover function entity.

6. The method according to claim 3, wherein determining, by the handover service function entity and according to the identifier of the first AP, the deployment type of the WiFi network wherein the first AP is located comprises sending, by the handover service function entity, the identifier of the first AP to a second server, and receiving a message indicating that the network wherein the first AP is located is of thin-AP-based network deployment type or fat-AP-based network deployment type, which is determined by the second server according to a preset mapping relationship between the identifier of the first AP and the deployment type of the network, wherein the thin-AP-based network deployment type utilizes a centralized authentication architecture that uses a unified authenticator to provide access authentication, and wherein the fat-AP-based network deployment type utilizes a distributed authentication architecture that uses distributed APs to provide the access authentication.

7. The method according to claim 1, further comprising:

receiving, by the handover service function entity, a medium access control (MAC) address of the MS, wherein the MAC address of the MS is sent by the MS; and identifying, by the handover service function entity, the connection established between the MS and the handover service function entity and a connection established between the handover service function entity and the authenticator entity or the network by using the MAC address of the MS and/or the identifier of the authenticator entity.

8. A processing method supporting handover, comprising:

discovering, by a mobile station (MS), a first access point (AP) in a wireless fidelity (WiFi) network;

obtaining an identifier of the first AP;

sending, by the MS, the identifier of the first AP to a first server;

receiving, by the MS from the first server, an address of a handover service function entity, wherein the handover service function entity corresponds to the identifier of the first AP, and wherein the address of the handover service function entity is determined according to a preset mapping relationship between the identifier of the first AP and the address of the handover service function entity;

sending the identifier of the first AP to the handover service function entity such that the handover service function entity discovers, according to the identifier, an authenticator entity corresponding to the first AP corresponding to the identifier;

establishing, by the MS, a connection with the handover service function entity;

sending to the handover service function entity a probe request message that is used to probe an AP to be associated;

receiving a probe request response message that is returned by the handover service function entity and carries an identifier of the AP to be associated with the MS;

associating with the AP corresponding to the identifier of the AP to be associated; and accessing the WiFi network through the AP to be associated and the authenticator entity.

9. A communication apparatus, comprising:

a memory having computer-executable instructions; and a computer processor coupled to the memory and configured to execute the computer-executable instructions to:

receive an identifier of a first access point (AP) from a mobile station (MS), wherein the first AP is discovered, by the MS, in a wireless fidelity (WiFi) network, wherein the MS obtains an address of the communication apparatus from a first server, and wherein the first server determines the address of the communication apparatus according to a preset mapping relationship between the identifier of the first AP and the address of the communication apparatus;

determine, according to the identifier of the first AP, an authenticator entity corresponding to the first AP corresponding to the identifier;

establish a connection with the MS;

receive a probe request message that is sent by the MS and used to probe an AP to be associated; and return to the MS a probe request response message that carries an identifier of the AP to be associated with the MS such that the MS associates with the AP corresponding to the identifier of the AP to be associated, and accesses the WiFi network through the AP to be associated and the authenticator entity.

10. The communication apparatus according to claim 9, wherein the first AP is a thin AP, wherein the thin AP utilizes a centralized authentication architecture having a unified authenticator that is located on an access controller, wherein the communication apparatus is a handover service function entity serving a thin-AP-based network, wherein the identifier of the AP to be associated is the identifier of the thin AP simulated by the handover service function entity, and wherein the computer processor is further configured to return to the MS the probe request response message that carries the identifier of the thin AP simulated by the handover function entity such that the MS associates with the thin AP simulated by the handover service function entity and accesses the WiFi network through the thin AP simulated by the handover service function entity and the authenticator entity.

11. The communication apparatus according to claim 9, wherein the first AP is a fat AP, wherein the fat AP utilizes a distributed authentication architecture, wherein each AP in the distributed architecture provides a function of an authenticator, wherein the communication apparatus is a handover service function entity serving a fat-AP-based network, wherein the identifier of the AP to be associated is the identifier of the first AP, and the authenticator entity is the first AP, and wherein the computer processor is further configured to forward to the first AP the probe request message sent by the MS, and forward to the MS the probe request response message that is returned by the first AP and carries the identifier of the first AP such that the MS is associated with the first AP and accesses the WiFi network through the first AP.

12. A communication apparatus, comprising:
a memory having computer-executable instructions; and
a computer processor coupled to the memory and configured to execute the computer-executable instructions to:
discover a first access point (AP) in a wireless fidelity (WiFi) network and obtain an identifier of the first AP;
send the identifier of the first AP to a first server:
receive from the first server an address of a handover service function entity, wherein the address of the handover service function entity is determined by the first server according to a preset mapping relationship between the identifier of the first AP and the address of the handover service function entity;
send the identifier of the first AP to the handover service function entity such that the handover service function entity determines, according to the identifier, an authenticator entity corresponding to the first AP corresponding to the identifier;
establish a connection with the handover service function entity;
send to the handover service function entity a probe request message that is used to probe an AP to be associated;
receive a probe request response message that is returned by the handover service function entity and carries an identifier of the AP to be associated with a mobile station (MS); and
associate with the AP to be associated, wherein the AP to be associated corresponds to the identifier of the AP to be associated, and access the WiFi network through the AP to be associated and the authenticator entity.

13. The communication apparatus according to claim 12, wherein the first AP is a thin AP, wherein the thin AP utilizes a centralized authentication architecture having a unified authenticator that is located on an access controller, wherein the handover service function entity is a handover service function entity serving a thin-AP-based network, and the identifier of the AP to be associated is the identifier of the thin AP simulated by the handover service function entity, wherein the computer processor is further configured to receive the probe request response message that is returned by the handover service function entity to the MS and carries the identifier of the thin AP simulated by the handover service function entity, and wherein the computer processor is further configured to associate with the thin AP simulated by the handover function entity, and access the WiFi network through the thin AP simulated by the handover function entity and the authenticator entity.

14. The communication apparatus according to claim 12, wherein the first AP is a fat AP, wherein the fat AP utilizes a distributed authentication architecture, wherein each AP in the distributed architecture provides a function of an authenticator, wherein the handover service function entity is the handover service function entity serving a fat-AP-based network, wherein the identifier of the AP to be associated is the identifier of the first AP, and the authenticator entity is the first AP, wherein the computer processor is further configured to receive the probe request response message that is forwarded by the handover service function entity to the MS and carries the identifier of the first AP after the handover service function entity forwards to the first AP the probe request message sent by the MS and receives the probe request response message that is returned by the first AP and carries the identifier of the first AP, and wherein the computer processor is further configured to associate with the first AP, and access the WiFi network through the first AP.

15. The method according to claim 1, wherein the first AP is a fat AP, wherein the fat AP utilizes a distributed authentication architecture, wherein each AP in the distributed architecture provides a function of an authenticator, wherein the handover service function entity is a handover service function entity serving a fat-AP-based network, and the identifier of the AP to be associated is the identifier of the first AP, and wherein returning to the MS the probe request response message that carries the identifier of the AP to be associated with the MS comprises forwarding to the first AP, by the handover service function entity, the probe request message sent by the MS, and forwarding to the MS the probe request response message that is returned by the first AP and carries the identifier of the first AP.

16. The method according to claim 15, wherein the deployment type is a fat-AP-based network deployment type, wherein the identifier of the AP to be associated is the identifier of the first AP, wherein after receiving the probe request message that is sent by the MS and used to probe the AP to be associated, the method further comprises forwarding, by the handover service function entity, to the first AP the probe request message sent by the MS, and wherein returning to the MS the probe request response message that carries the identifier of the AP to be associated with the MS comprises forwarding to the MS the probe request response message returned by the first AP.

* * * * *